US010755707B2

(12) United States Patent
Bender et al.

(10) Patent No.: US 10,755,707 B2
(45) Date of Patent: Aug. 25, 2020

(54) SELECTIVELY BLACKLISTING AUDIO TO IMPROVE DIGITAL ASSISTANT BEHAVIOR

(71) Applicant: INTERNATIONAL BUSINESS MACHINES CORPORATION, Armonk, NY (US)

(72) Inventors: Michael Bender, Rye Brook, NY (US); Kulvir S. Bhogal, Fort Worth, TX (US); Jeremy R. Fox, Georgetown, TX (US); Rick A. Hamilton, II, Charlottesville, VA (US)

(73) Assignee: International Business Machines Corporation, Armonk, NY (US)

(*) Notice: Subject to any disclaimer, the term of this patent is extended or adjusted under 35 U.S.C. 154(b) by 165 days.

(21) Appl. No.: 15/978,631

(22) Filed: May 14, 2018

(65) Prior Publication Data
US 2019/0348034 A1    Nov. 14, 2019

(51) Int. Cl.
| G10L 15/22 | (2006.01) |
| G10L 15/08 | (2006.01) |
| G10L 25/51 | (2013.01) |
| H04N 21/439 | (2011.01) |
| H04L 29/08 | (2006.01) |

(52) U.S. Cl.
CPC .............. G10L 15/22 (2013.01); G10L 15/08 (2013.01); G10L 25/51 (2013.01); H04N 21/439 (2013.01); G10L 2015/088 (2013.01); G10L 2015/223 (2013.01); H04L 67/12 (2013.01)

(58) Field of Classification Search
CPC ......... G10L 15/22; G10L 15/00; G10L 15/01; G10L 15/06; G10L 15/07; G10L 15/08; G10L 15/20; G10L 15/24; G10L 15/26; G10L 15/30; G10L 15/34; G10L 2015/22; G10L 2015/00; G10L 2015/06; G10L 2015/08; G10L 2015/223; G10L 2015/225; G10L 2015/227; G10L 2015/228
USPC ....... 704/251, 231, 235, 243, 250, 255, 270, 704/270.1, 275
See application file for complete search history.

(56) References Cited

U.S. PATENT DOCUMENTS

| 5,899,972 A | 5/1999 | Miyazawa et al. |
| 7,882,032 B1 | 2/2011 | Hoffman |
| 9,691,378 B1 | 6/2017 | Meyers et al. |
| 9,728,188 B1 | 8/2017 | Osen et al. |

(Continued)

FOREIGN PATENT DOCUMENTS

| CN | 103379367 A | 10/2013 |
| KR | 20070055890 A | 5/2007 |

OTHER PUBLICATIONS

Christophe, "How does Shazam work," http://coding-geek.com/how-shazam-works/, posted on May 23, 2015, pp. 1-52.

(Continued)

*Primary Examiner* — Qi Han
(74) *Attorney, Agent, or Firm* — Alexis N. Hatzis (57) ABSTRACT

A method, computer system, and a computer program product for selectively blacklisting audio commands is provided. The present invention may include observing an audible command received by an IoT (Internet of Things) enabled device, wherein the observed audible command appears in a blacklist database. The present invention may also include blacklisting the observed audible command.

17 Claims, 5 Drawing Sheets

(56) References Cited

U.S. PATENT DOCUMENTS

| | | |
|---|---|---|
| 9,786,298 B1 | 10/2017 | Greene |
| 2003/0216919 A1 | 11/2003 | Roushar |
| 2008/0091426 A1 | 4/2008 | Rempel et al. |
| 2008/0301135 A1 | 12/2008 | Alves et al. |
| 2009/0177700 A1* | 7/2009 | Grim, III ............... G06Q 10/10 |
| 2009/0294538 A1 | 12/2009 | Wihlborg et al. |
| 2014/0278435 A1 | 9/2014 | Ganong, III et al. |
| 2015/0301796 A1 | 10/2015 | Visser et al. |
| 2016/0111091 A1* | 4/2016 | Bakish ..................... G10L 15/30 704/275 |
| 2017/0345420 A1* | 11/2017 | Barnett, Jr. ............. G06F 3/167 |
| 2018/0241813 A1* | 8/2018 | Funk ................... H04L 67/1042 |
| 2019/0342339 A1* | 11/2019 | Nanda ................... G06F 21/604 |

OTHER PUBLICATIONS

Hardwick, "Burger King TV Ad Highlights Voice Recognition Challenge for Smart Speakers," https://www.macrumors.com/2017/04/13/burger-king-ad-google-home-smart-speaker, Posted Apr. 13, 2017, pp. 1-10.

Islam et al., "SoundSifter: Mitigating Overhearing of Continuous Listening Devices," Proceedings of the 15th Annual International Conference on Mobile Systems, Applications, and Services, pp. 1-15, Conference Paper: Jun. 2017.

Moynihan, "How to Keep Amazon Echo and Google Home From Responding to Your TV," https://www.wired.com/2017/02/keep-amazon-echo-google-home-responding-tv/, Feb. 6, 2017, pp. 1-7.

Vincent, "Inaudible ultrasound commands can be used to secretly control Siri, Alexa, and Google Now," https://www.theverge.com/2017/9/7/16265906/ultrasound-hack-siri-alexa-google, Sep. 7, 2017, pp. 1-4.

Stone et al., "Why Your Echo Won't Perk Up During Amazon's Super Bowl Ad," Fortune, http://fortune.com/2018/02/03/alexa-super-bowl-ad/, Feb. 3, 2018, pp. 1-2.

Mell et al., "The NIST Definition of Cloud Computing," National Institute of Standards and Technology, U.S. Department of Commerce, Special Publication 800-145, Sep. 2011, pp. 1-7.

* cited by examiner

SELECTIVELY BLACKLISTING AUDIO TO IMPROVE DIGITAL ASSISTANT BEHAVIOR

BACKGROUND

The present invention relates generally to the field of computing, and more particularly to digital assistants.

With the increase in digital assistants and the growth of information of things (IoT) enabled devices throughout homes, competition to introduce new voice interfaces is growing. Furthermore, the growth of IoT enabled devices will spread beyond use in mobile phones, such as Ski® (Ski® and all Siri®-based trademarks and logos are trademarks or registered trademarks of Apple Inc. and/or its affiliates), and home-based beacons, such as Amazon Echo® (Amazon Echo® and all Amazon Echo®-based trademarks and logos are trademarks or registered trademarks of Amazon Technologies, Inc. and/or its affiliates) and/or Google Home® (Google Home® and all Google Home®-based trademarks and logos are trademarks or registered trademarks of Google Inc. and/or its affiliates), to many different areas. Automotive manufacturers and other makers of household goods plan to introduce similar interfaces into their products, and are working to implement meaningful and useful interfaces for consumers.

SUMMARY

Embodiments of the present invention disclose a method, computer system, and a computer program product for selectively blacklisting audio commands. The present invention may include observing an audible command received by an IoT (Internet of Things) enabled device, wherein the observed audible command appears in a blacklist database. The present invention may also include blacklisting the observed audible command.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for selectively blacklisting audio sounds to improve digital assistant behavior. As such, the present embodiment has the capacity to improve the technical field of digital assistants and Information of Things (IoT) enabled devices by blacklisting commands heard by a digital assistant on an IoT enabled device. More specifically, the digital assistant audio improver program and/or the digital assistant audio improver program user may load a database (i.e., a blacklist database) with a projected television schedule, including a commercial lineup and a commercial timetable, based on information offered by a user's television provider. The digital assistant audio improver program may then observe an audible command. The digital assistant audio improver program may decide whether an observed audible command occurs at the same time as a commercial which may trigger a user's IoT enabled device, for example, by utilizing timestamps on the television program. If the digital assistant audio improver program decides that the observed command occurs at the same time as a commercial which may trigger a user's IoT enabled device, then the digital assistant audio improver program may advise the digital assistant to decline to act as requested in the observed command (e.g., the digital assistant may blacklist the observed command). Otherwise, if the digital assistant audio improver program decides that the observed command does not occur at the same time as a commercial with the potential to trigger a user's IoT enabled device, then the digital assistant audio improver program may advise or permit the digital assistant to act as requested in the observed command.

As described previously, with the increase in digital assistants and the growth of information of things (IoT) enabled devices (e.g., cognitive agents which may be embedded with software and sensors enabling the device to connect to one or more other devices and exchange information) throughout homes, competition to introduce new voice interfaces is growing. Furthermore, the growth of IoT enabled devices will spread beyond use in mobile phones, such as Ski® (Ski® and all Siri®-based trademarks and logos are trademarks or registered trademarks of Apple Inc. and/or its affiliates), and home-based beacons, such as Amazon Echo® (Amazon Echo® and all Amazon Echo®-based trademarks and logos are trademarks or registered trademarks of Amazon Technologies, Inc. and/or its affiliates) and/or Google Home® (Google Home® and all Google Home®-based trademarks and logos are trademarks or registered trademarks of Google Inc. and/or its affiliates), to many different potential uses. Automotive manufacturers and makers of household goods may introduce similar interfaces into developed products. Accompanying this growth will be increased marketing for the newly developed solutions. When IoT enabled devices (e.g., Siri®, Google Home®, Amazon Echo®, among others) are within speaker range of another closely located media device (e.g., a television), commands issued on television may be observed by the IoT enabled device, and an undesirable action may be undertaken as a result.

Therefore, it may be advantageous to, among other things, differentiate commands issued by a user of the IoT enabled device from commands issued by a closely located media device.

According to at least one embodiment, a closely located media device may include a television, a radio, and/or a smartphone, among other media devices, and the sounds observed from the television, the radio, and/or the smartphone may include movies, songs, commercials (e.g., advertisements or segmented video clips which may be played during a break in regular scheduled television or radio segments), television shows, radio segments, or video games.

According to at least one embodiment, a digital assistant audio improver program may prevent audio commands observed on a commercial from triggering any action by a cognitive assistant on an IoT enabled device. The digital assistant audio improver program may recognize television programs that a user is watching and may be aware of scheduled commercial times. The digital assistant audio improver program may utilize commercial skipping algorithms to buffer (e.g., ignore, blacklist) commands observed on television playback.

According to at least one embodiment, the digital assistant audio improver program may facilitate an IoT enabled device in blacklisting audio observed from a closely located media device (e.g., a television or radio), where blacklisting audio may include preventing the IoT enabled device from executing (e.g., acting on) voice commands broadcasted by the television or radio during a movie, song, commercial, television show, radio segment, or video game. A determination of blacklisted commands may be based on data uploaded to the digital assistant audio improver program's associated blacklist database.

According to at least one embodiment, keywords and commands spoken in a commercial may not trigger action by the IoT enabled device (e.g., Siri®, Google Home®, Amazon Echo®, among others).

According to at least one embodiment, the digital assistant audio improver program may determine that a commercial is airing (e.g., running, playing), based on a published schedule inputted into the blacklist database, and may ignore commands that are observed during a commercial's air time, based on the published schedule. The published schedule may be generated by loading commercials and their expected run times into the blacklist database.

According to at least one embodiment, the digital assistant audio improver program may utilize a digital video recorder ("DVR") player to play back recorded television shows and to recognize that a commercial is being played. Utilizing the capabilities of the DVR player, the digital assistant audio improver program may skip over (e.g., avoid playing) recognized commercials. The digital assistant audio improver program may recognize that the playback is of a commercial based on a time stamp on the recording, and may thereby avoid playing it. In instances where a DVR player fails to avoid playing a commercial, the digital assistant audio improver program may utilize the blacklist database, containing a schedule of commercials, as well as the commercials' time stamps, to ignore observed commands captured during a commercial's playback by the IoT enabled device.

According to at least one embodiment, the digital assistant audio improver program may distinguish a commercial from an audio command issued by a user, and may determine that a commercial is playing, based on identification of an embedded audio key or audio tone. For example, a predetermined two-tone signal in the commercial may suggest to the digital assistant audio improver program that the digital assistant audio improver program should skip over (e.g., avoid playing) a predefined portion of playback.

According to at least one embodiment, the digital assistant audio improver program may prevent audio commands from a commercial or other media from triggering action by the IoT enabled device based on various audio sources which may be loaded into a blacklist database and accessed by the digital assistant audio improver program. Utilizing the blacklist database, the digital assistant audio improver program may compare data stored within the blacklist database to data observed by the IoT enabled device. The compared data may include audio fingerprints and/or observed audio commands.

According to at least one embodiment, a user of an IoT enabled device may issue an audio segment (e.g., an observed audio command) to the digital assistant audio improver program to determine whether the uploaded audio segment is blacklisted. If the digital assistant audio improver program determines that the audio segment is contained within the blacklist database, then the audio segment may not be interpreted or executed (e.g., the IoT enabled device may not act based on, or in accordance with, the observed command).

According to at least one embodiment, a blacklist database may be stored on a cloud-based service, and may be connected to by the IoT enabled device, to permit local (e.g., immediate, instant) determinations on audio segment comparisons and commercial schedules.

Figure 1:
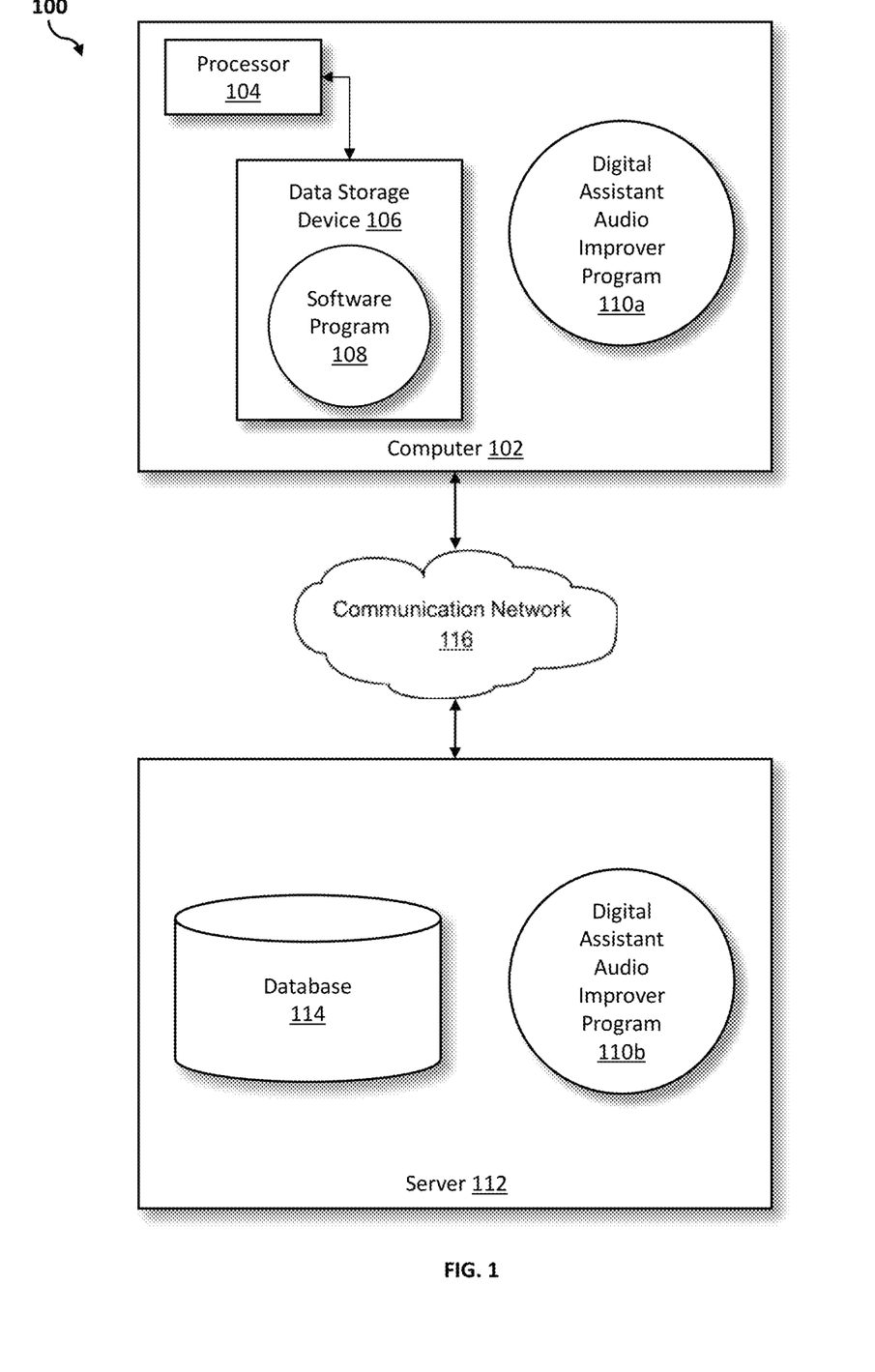
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a digital assistant audio improver program 110a. The networked computer environment 100 may also include a server 112 that is enabled to run a digital assistant audio improver program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the digital assistant audio improver program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the digital assistant audio improver program 110a, 110b (respectively) to selectively blacklist observed audio commands and prevent the blacklisted commands from triggering any action by a digital assistant on an IoT enabled device. The digital assistant audio improver method is explained in more detail below with respect to FIG. 2.

Figure 2:
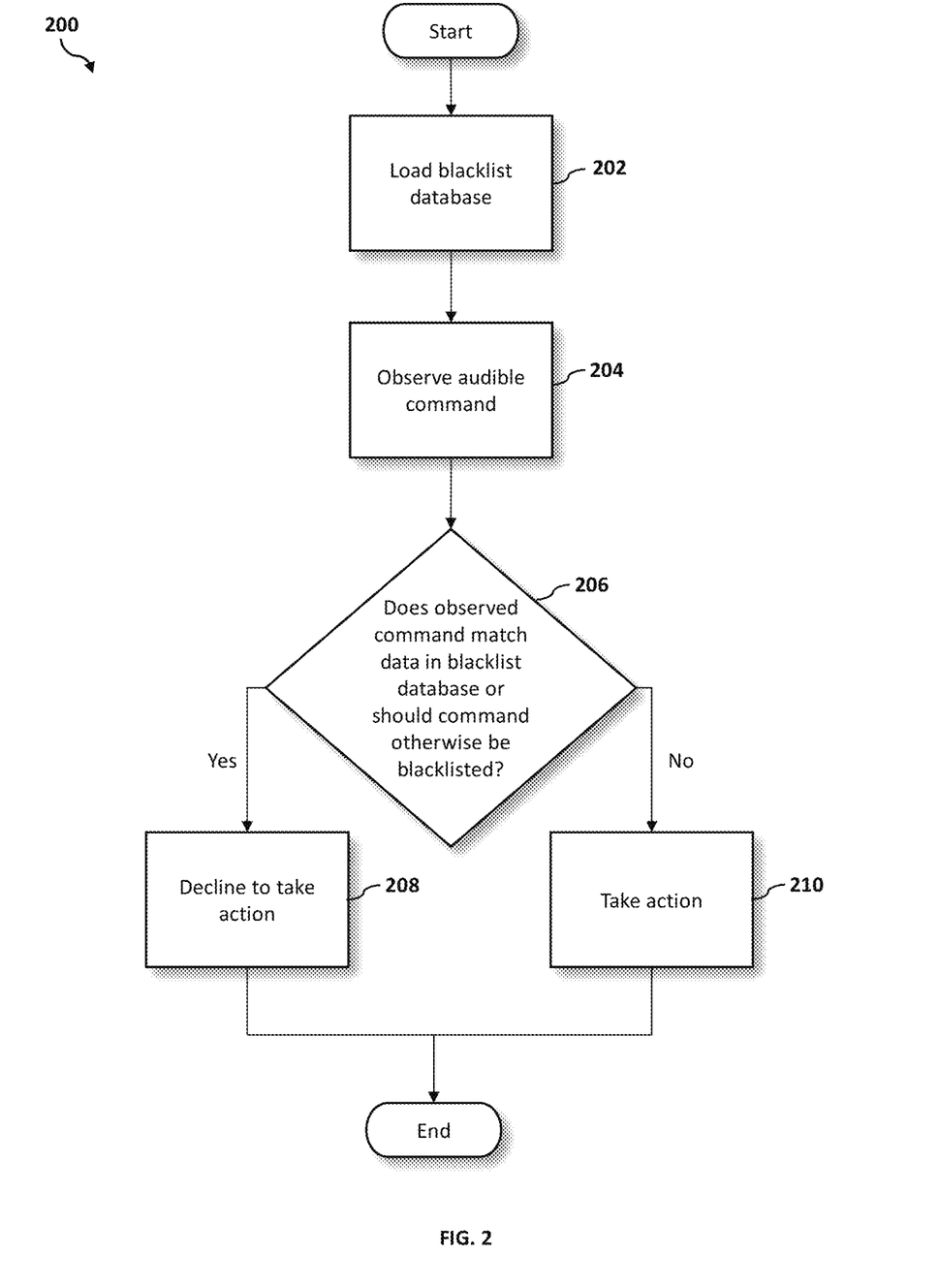
FIG. 2 is an operational flowchart illustrating a process for blacklisting audio commands according to at least one embodiment.

Referring now to FIG. 2, an operational flowchart illustrating the exemplary digital assistant audio improver process 200 used by the digital assistant audio improver program 110a and 110b according to at least one embodiment is depicted.

At 202, a blacklist database is loaded. A user of the digital assistant audio improver program 110a, 110b may upload data (e.g., a television schedule describing a list of television shows and including a corresponding time table, an audio fingerprint, and/or an audio trigger word) that the digital assistant audio improver program 110a, 110b desires to ignore (i.e., blacklist data) to a blacklist database (e.g., database 114). Blacklist data uploaded to the blacklist database (e.g., database 114) by a user of the digital assistant audio improver program 110a, 110b may be referred to as user blacklist data, while blacklist data uploaded to the blacklist database by a media provider may be referred to as provider blacklist data. The blacklist database may also be loaded with a list of television commercials that are scheduled to be played on the user's television network. A time of the scheduled commercials may also be inputted into the blacklist database (e.g., a commercial time table).

Television, radio, and/or video recordings may be analyzed to determine whether key words appearing within the recording may inadvertently trigger a listening device (e.g., an IoT enabled device). For example, a television show recording which contains references to a character named Alexis may trigger a reaction by the IoT enabled device. Accordingly, a user of the digital assistant audio improver program 110a, 110b may add the trigger phrase or phrases to the blacklist database so that future instances of the same phrase may be ignored.

The digital assistant audio improver program 110a, 110b may be a cloud based service which is connected to an IoT enabled device, and which is also connected to the user's cable box, media provider (e.g., a group of people authorized to act as a single entity, whether recognized as such in law or otherwise, who distribute or otherwise provide media services), DVR player, internet and/or television, to permit the digital assistant audio improver program 110a, 110b to access information pertaining to the user's television lineup, the television channel a user may be watching, and/or a commercial which may be scheduled to play on the television channel being viewed by the user. A connected blacklist database may consist of time marked recordings of television shows and/or commercials, among other things, based on the digital assistant audio improver program 110a, 110b user's inputted information and connected internet and/or cable network provider.

Media services (e.g., cable services) may be defined as data communication services whereby a media provider is a data transmitter, and transmits data to a user, who is a data receiver. Data transmission may occur according to any known method of data communication, such as analog or digital broadcast data transmission using wired or wireless communication networks, or a combination of them. The data to be transmitted may include multiple structural segments, such as metadata and consumable segments. The metadata may include, for example, information that identifies the source and target of, and information that characterizes, the data to be transmitted. The consumable segments may include, for example, the data that is ultimately communicated to a user based, in part, on the metadata; for example, the consumable segments may include information for rendering an image on a display or audio signals for emission via a speaker. Consumable segments may include advertisement segments. Media services may also include making available additional data and metadata that identifies times and durations at which the consumable segments, and their advertisement segments, are made available (historically, at present, or in the future); i.e. a schedule.

Blacklisted data, including television timetable data and audio data, desired to be ignored by the digital assistant audio improver program 110a, 110b, may be identified by the user of the digital assistant audio improver program 110a, 110b, the internet and/or media provider (e.g., cable provider), and/or the device manufacturer. Blacklisted data may be loaded into a blacklist database by a manufacturer of the IoT enabled device (e.g., Amazon Technologies, Apple Inc., and/or Google Inc., among others) and/or a media provider, which may be referred to as provider blacklist data.

For example, Amazon Technologies may contract with an internet and/or media provider to notify (e.g., inform, alert) Amazon Technologies each time an Amazon Echo® commercial is playing. Any alert received by Amazon Technologies may be made part of the blacklist database associated with the digital assistant audio improver program 110a, 110b.

Web based services, including but not limited to video clips and/or songs, may be scanned as well, and audio data from web based services (e.g., web based content) may also be loaded into the blacklist database. Additional content may be provided by a digital assistant audio improver program 110a, 110b user, and may be loaded into the blacklist database associated with the digital assistant audio improver program 110a, 110b in the same manner as web based content.

At 204, an audible command is observed. An IoT enabled device (e.g., Siri®, Google Home®, and/or Amazon Echo®, among others) may listen for audible commands that are issued within range of the IoT enabled device. The range of audible commands observed by the IoT enabled device may differ depending on the IoT enabled device used, and the inherent capabilities of that device.

For example, Chris owns an Amazon Echo® which he has placed on the coffee table of his media room. Chris' Amazon Echo® is located within close proximity to Chris' television, and as a result, Chris' Amazon Echo® observes an audible command issued on a commercial for the Amazon Echo®. The commercial is played on his television, and depicts a demonstration of the device's capabilities. The command on the commercial is issued by a young female actress, who directs the device to play music. Chris does not want the observed command to trigger any action by his own Amazon Echo®.

A user's IoT enabled device may also be triggered by an unanticipated command. Where the observed command contains a trigger word or phrase (e.g., "Hey Google," "Alexa," and/or "Alexis," among others), this may result in initiation of the digital assistant interface of the IoT enabled device (e.g., Siri®, Google Home®, and/or Amazon Echo®, among others). However, the digital assistant audio improver program 110a, 110b may compare an audio signature of expected commands (e.g., on an anticipated Amazon Echo® commercial) to the observed command, to determine whether the IoT enabled device should act in accordance with the observed command.

At 206, the digital assistant audio improver program 110a, 110b determines if the observed command matches data contained within the blacklist database (e.g., if the observed command is a trigger word or phrase, and/or if the command is observed during an expected Amazon Echo® commercial, based on the inputted television schedule) or if the command should otherwise be blacklisted. Once the IoT enabled device observes an audible command, the digital assistant audio improver program 110a, 110b compares the observed audible command to the database 114 of stored audio data (e.g., a television schedule, a television timetable, an audio fingerprint, and/or an audio trigger word). The digital assistant audio improver program 110a, 110b compares the observed audible command to each piece of stored data by iterating through the database 114 until each piece of data has been compared to the observed audible command, or until a match has been found.

Audio signatures which occur before (e.g., a preamble) and/or after (e.g., a post script) the observed command may be considered in determining whether the observed command should be executed or should be blacklisted (e.g., not acted upon). The digital assistant audio improver program 110a, 110b may utilize additional data to understand the context of the observed command and make an informed decision as to whether the observed command should be blacklisted.

Additionally, a user of the digital assistant audio improver program 110a, 110b may choose to blacklist all commands issued during a predetermined and preconfigured period of time (e.g., a blackout period). For example, a user of the digital assistant audio improver program 110a, 110b may configure (e.g., using an online interface or a digital application which displays details of the digital assistant audio improver program 110a, 110b, including connected devices and configured settings) the digital assistant audio improver program 110a, 110b to blacklist all commands observed during the hours of 9 am EST to 5 pm EST, when the user's small child is home with the child's babysitter, so that the child does not trigger the device and cause it to purchase unwanted items from connected websites. During this preconfigured blackout period, any commands observed by the IoT device within the device's general vicinity may be blacklisted (e.g., observed commands may not executed during a configured blackout period).

However, in addition to configuring a blackout period, a user of the digital assistant audio improver program 110a, 110b may configure an authorized user or users of the digital assistant audio improver program 110a, 110b whose close proximity to the IoT device may override a configured blackout period and may permit observed commands to be executed. An authorized user may be configured by utilizing an online interface or a digital application which displays details including connected devices, configured settings, and authorized users, among other things. If it is determined by the digital assistant audio improver program 110a, 110b that an authorized user is located within the vicinity of the IoT device, based on a user's connected mobile device or tablet's global positioning system (GPS) location, a utilization of the same internet network by the user's connected mobile device or tablet and the IoT device, an established Bluetooth® (Bluetooth and all Bluetooth-based trademarks and logos are trademarks or registered trademarks of Bluetooth SIG, Inc. and/or its affiliates) connection between the user's mobile device or tablet and the IoT device, or based on the observed volume of the user's voice (e.g., a louder observed audio command may indicate that an authorized user is closely located to the connected IoT device), as observed by the connected IoT device and the digital assistant audio improver program 110a, 110b, then commands observed during a blackout period may nevertheless be considered.

The configuration of a blackout period and an authorized user or users, who may override a blackout period configuration, may result in a prioritization of observed commands, whereby even if a command may be blacklisted by the digital assistant audio improver program 110a, 110b, based on a configured blackout period, an authorized user or users may override the blackout period configuration and may be given higher priority over other users of the digital assistant audio improver program 110a, 110b.

If, at 206, the digital assistant audio improver program 110a 110b determined that the observed command matched data contained within the blacklist database, then the IoT enabled device declines to act at 208 (e.g., the observed command is considered a trigger phrase). When a trigger phrase is identified, based on a comparison of the observed command to data contained within the blacklist database, as well as a comparison of the preamble and post script of the observed command, the trigger phrase may be ignored and the digital assistant audio improver program 110a, 110b may not execute any command contained within the trigger phrase.

For example, when a trigger phrase is identified, based on a comparison of the observed command to data contained within the blacklist database, the trigger phrase may be ignored. The digital assistant audio improver program 110a, 110b may ignore (e.g., blacklist, override, overlook, decline to execute) a trigger phrase by adding the trigger phrase to a blacklist queue within the digital assistant audio improver program 110a, 110b. Trigger phrases contained within the blacklist queue of the digital assistant audio improver program 110a, 110b may not be executed by the IoT device.

If, at 206, the digital assistant audio improver program 110a, 110b determined that the observed command did not match data contained within the blacklist database (e.g., the observed command was not a trigger phrase) and the command should not otherwise be blacklisted, then the IoT enabled device takes action in accordance with the observed command at 210 (e.g., executes the observed command).

For example, when an observed command does not match data contained within the blacklist database, based on a comparison of the observed command to data contained within the blacklist database, the observed command may be added to a fulfill queue within the digital assistant audio improver program 110a, 110b. Observed commands added to the fulfill queue of the digital assistant audio improver program 110a, 110b may be fulfilled (e.g., executed, achieved, implemented, effected, carried out) by the IoT enabled device.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
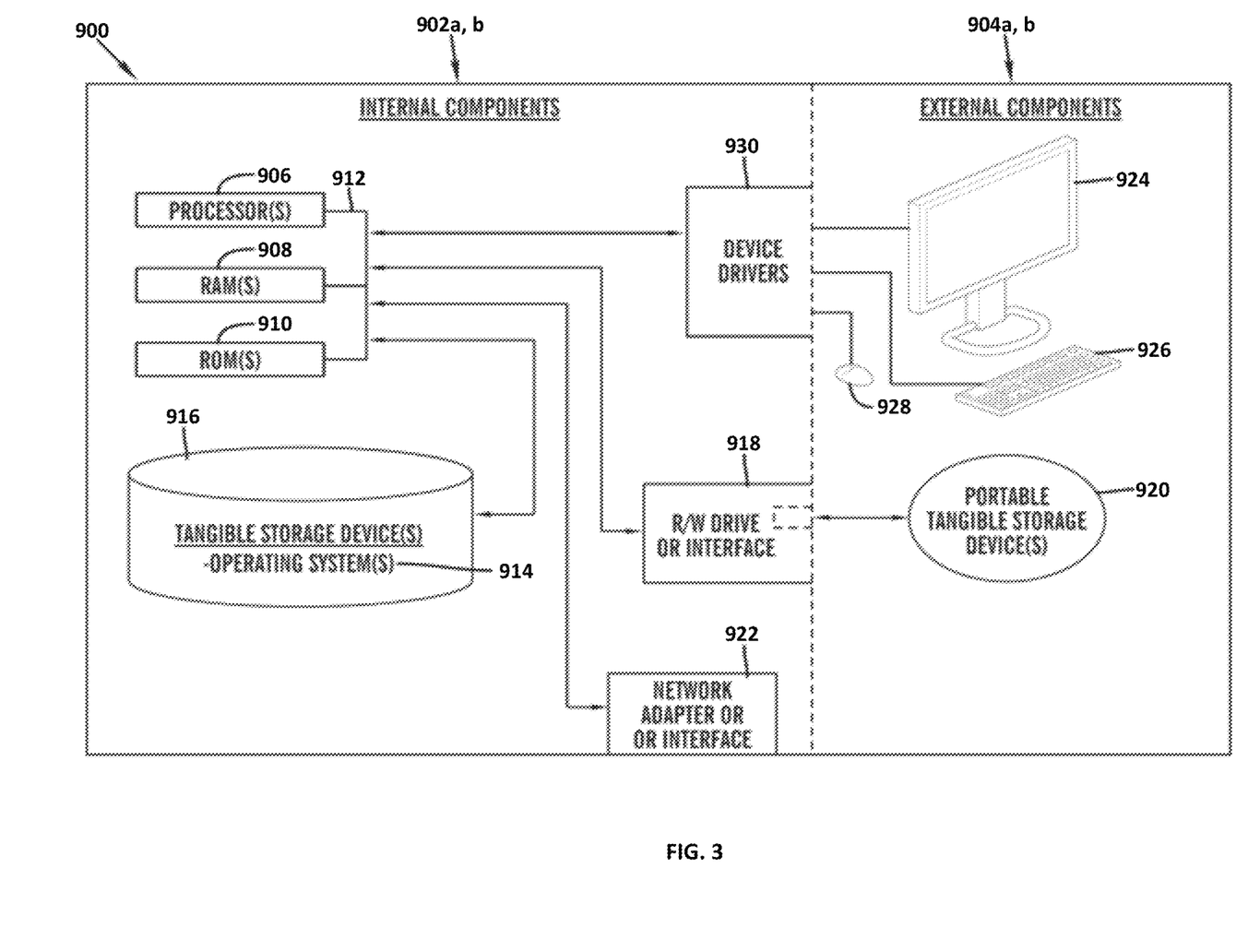
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the digital assistant audio improver program 110a in client computer 102, and the digital assistant audio improver program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the digital assistant audio improver program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the digital assistant audio improver program 110a in client computer 102 and the digital assistant audio improver program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the digital assistant audio improver program 110a in client computer 102 and the digital assistant audio improver program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
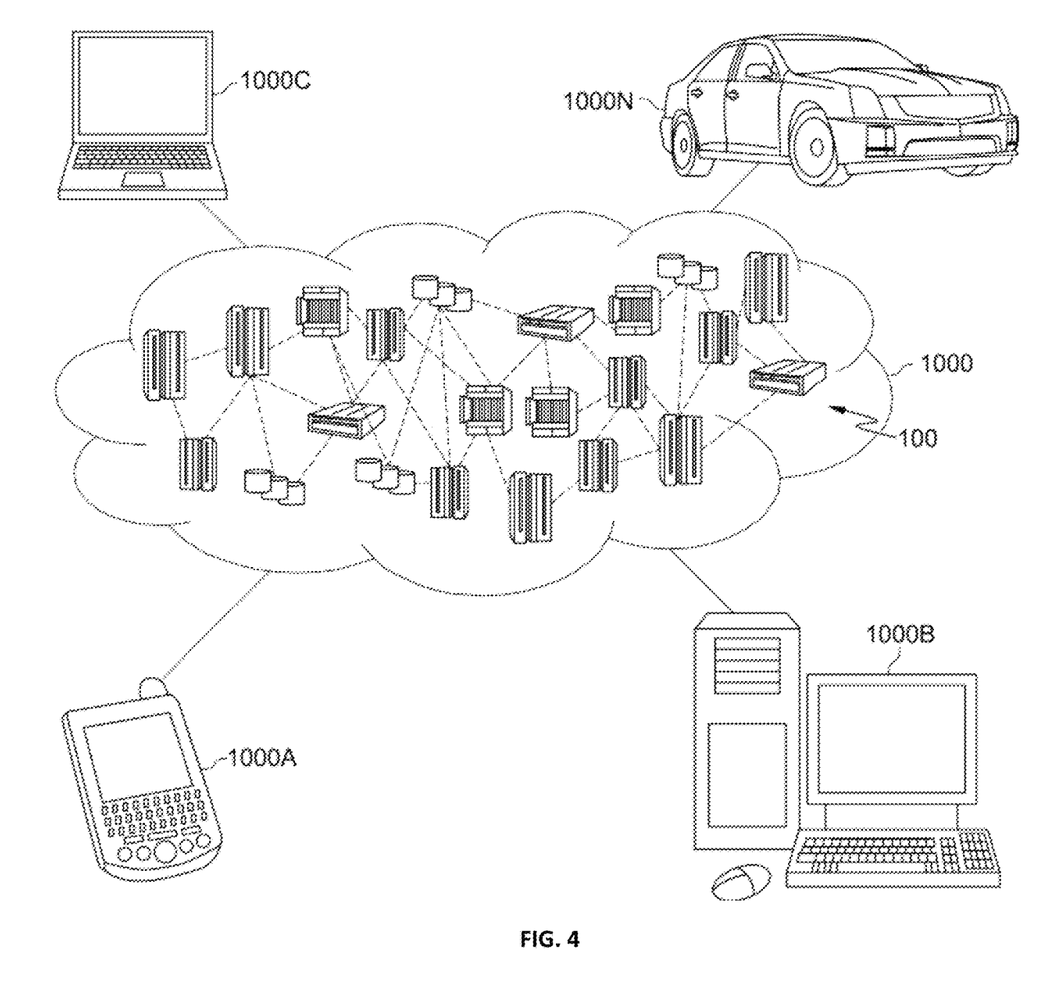
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
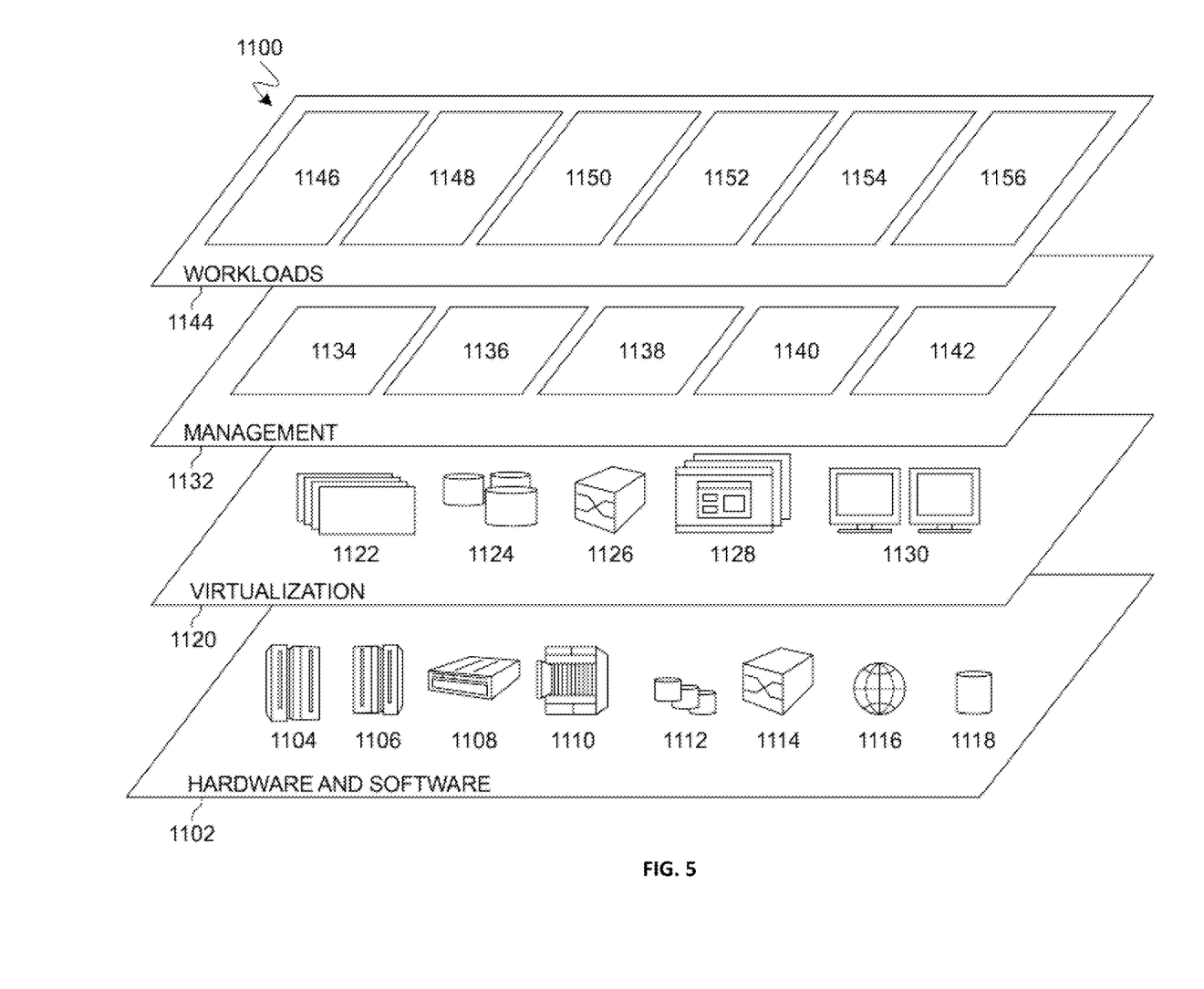
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and digital assistant audio improver 1156. A digital assistant audio improver program 110a, 110b provides a way to selectively blacklist observed audio commands and prevent the blacklisted commands from triggering any action by a digital assistant on an IoT enabled device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selectively blacklisting audio commands, the method comprising:
    observing an audible command received by an IoT (Internet of Things) enabled device; and
    blacklisting the observed audible command based on a blacklist database, wherein the blacklist database comprises user blacklist data uploaded by a program user and provider blacklist data uploaded by a media provider, the user blacklist data and provider blacklist data comprising a television schedule, an audio fingerprint, and an audio trigger word.

2. The method of claim 1, wherein a blackout period is defined by a program user.

3. The method of claim 1, wherein the television schedule further comprises a commercial time table.

4. The method of claim 1, wherein the audible command is observed on an IoT (Internet of Things) enabled device.

5. The method of claim 1, wherein blacklisting the observed audible command further comprises:
    determining that the observed audible command matches a plurality of data in the blacklist database; and
    adding the observed audible command to a blacklist queue.

6. The method of claim 5, wherein determining that the observed audible command matches the plurality of data in the blacklist database further comprises:
    comparing the observed audible command to the plurality of data in the blacklist database.

7. A computer system for selectively blacklisting audio commands, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performs a method comprising:
    observing an audible command received by an IoT (Internet of Things) enabled device; and
    blacklisting the observed audible command based on a blacklist database, wherein the blacklist database comprises user blacklist data uploaded by a program user and provider blacklist data uploaded by a media provider, the user blacklist data and provider blacklist data comprising a television schedule, an audio fingerprint, and an audio trigger word.

8. The computer system of claim 7, wherein a blackout period is defined by a program user.

9. The computer system of claim 7, wherein the television schedule further comprises a commercial time table.

10. The computer system of claim 7, wherein the audible command is observed on an IoT (Internet of Things) enabled device.

11. The computer system of claim 7, wherein blacklisting the observed audible command further comprises:
    determining that the observed audible command matches a plurality of data in the blacklist database; and
    adding the observed audible command to a blacklist queue.

12. The computer system of claim 11, wherein determining that the observed audible command matches the plurality of data in the blacklist database further comprises:
    comparing the observed audible command to the plurality of data in the blacklist database.

13. A computer program product for selectively blacklisting audio commands, comprising:
    one or more computer-readable storage media and program instructions stored on at least one of the one or more tangible storage media, the program instructions executable by a processor to cause the processor to perform a method comprising:
    observing an audible command received by an IoT (Internet of Things) enabled device; and
    blacklisting the observed audible command based on a blacklist database, wherein the blacklist database comprises user blacklist data uploaded by a program user and provider blacklist data uploaded by a media provider, the user blacklist data and provider blacklist data comprising a television schedule, an audio fingerprint, and an audio trigger word.

14. The computer program product of claim 13, wherein a blackout period is defined by a program user.

15. The computer program product of claim 13, wherein the television schedule further comprises a commercial time table.

16. The computer program product of claim 13, wherein the audible command is observed on an IoT (Internet of Things) enabled device.

17. The computer program product of claim 13, wherein blacklisting the observed audible command further comprises:
    determining that the observed audible command matches a plurality of data in the blacklist database; and
    adding the observed audible command to a blacklist queue.

* * * * *